United States Patent [19]

Amen

[11] Patent Number: 4,722,324

[45] Date of Patent: Feb. 2, 1988

[54] POSITIONABLE WEED BURNING APPARATUS

[76] Inventor: Leland C. Amen, 44500 Road 64.5, Crook, Colo. 80726

[21] Appl. No.: 880,673

[22] Filed: Jun. 30, 1986

[51] Int. Cl.$^4$ ............................................... F23C 5/00
[52] U.S. Cl. .............................. 126/271.2 R; 239/172; 239/176; 239/587
[58] Field of Search ..................... 126/271.1, 271.2 R, 126/271.2 C; 239/587, 172, 176

[56] References Cited

U.S. PATENT DOCUMENTS

| | | | |
|---|---|---|---|
| 2,543,166 | 2/1951 | Heining | 126/271.2 C |
| 2,690,085 | 9/1954 | Freeman | 239/587 |
| 2,698,664 | 1/1955 | Freeman | 239/587 |
| 3,804,078 | 4/1974 | Brazan | 126/271.2 C |

Primary Examiner—Carroll B. Dority, Jr.
Attorney, Agent, or Firm—Dean P. Edmundson

[57] ABSTRACT

Positionable weed burning apparatus is described which is adapted to support an elongated burner boom and which is further adapted to be connected to a conventional three-point hitch on a tractor. The apparatus enables the boom to be raised, lowered, and moved from side to side by the operator of the tractor. Only one person is required in order to operate the apparatus. Because the burner boom may be quickly and accurately positioned to any desired location by the operator of the tractor, irrigation ditches may be rapidly and efficiently burned using the apparatus of this invention.

17 Claims, 9 Drawing Figures

POSITIONABLE WEED BURNING APPARATUS

FIELD OF THE INVENTION

This invention relates to weed burning apparatus. More particularly, this invention relates to apparatus and techniques for burning weeds which enables one person to operate and control a weed burner.

BACKGROUND OF THE INVENTION

In areas of the country where farmers irrigate their fields by means of ditches to run the irrigation water, there is a need to remove all grass and weeds and other such foliage which grows in the ditches between uses. The weeds and grass in the ditches impede the flow of water through the ditches.

Various types of weed burning apparatus are commercially available for burning weeds in ditches. Some types utilize a large tank of propane, diesel fuel, etc., which must be carried on a truck bed or trailer. An elongated boom is connected to the fuel source with a flexible hose. The boom includes means for allowing air to mix with the fuel, and a nozzle at the outer end of the boom directs the flame when the fuel and air mixture is ignited. A valve controls the rate of fuel flow to the nozzle. Hence, the valve controls the size of the flame.

Another type of commercially available weed burning boom utilizes an elongated metal boom (e.g., aluminum) which is mounted on a stand or support carried by a truck or trailer. The boom includes a motor driven fan to mix air with fuel (e.g., diesel fuel) and force it through the length of the boom to a nozzle at the outer end of the boom.

With such commercially available weed burners there is a need for two persons to properly operate them. One person must drive the truck, tractor, etc., which tows or carries the fuel supply tank and the weed burner apparatus. The other person holds or otherwise controls the weed burning boom and directs the flame where it is required in order to properly burn foliage in the ditches.

Because the unwanted foliage in irrigation ditches is usually not uniform in size and is not uniformly distributed along a ditch, it is not possible to move the weed burning apparatus along a ditch at a constant speed. Consequently, to properly burn foliage in a ditch, it is necessary for the driver to slow down or stop when heavier areas of foliage are present in the ditch. However, the driver often cannot see into the ditch being burned and therefore must rely upon shouted signals and directions from the person controlling the boom. Mis-communications or misunderstandings between the driver and the person controlling the boom may cause certain sections of a ditch to be incompletely burned. This may require a second trip along a ditch to burn such sections.

SUMMARY OF THE INVENTION

In accordance with the present invention there is provided novel weed burning apparatus which is fully positionable and controllable by one person for burning ditches, trenches, or the like to remove unwanted foliage. The apparatus is adapted to be attached to and supported by the conventional three-point hitch of a farm tractor. The operator drives the tractor and has full control over the positioning of the apparatus and the speed and direction of the tractor.

Consequently, the weed burning apparatus of this invention may be operated and controlled by one person. As a result, sections of a ditch which have heavier foliage may be fully burned in one pass by slowing the speed of the tractor to correspond with the rate at which the foliage is being burned. The speed of the tractor may be quickly increased when sections of a ditch having light foliage are encountered. Thus, the apparatus of this invention enables ditches to be burned very quickly and efficiently. The operator can remain on the tractor in the operator's position during use and this promotes safety and comfort.

In one embodiment, the apparatus of this invention comprises:

(a) a horizontally disposed elongated bar having attachment means adapted to detachably connect the bar to the three-point hitch of a tractor;

(b) an elongated carriage member having first and second ends; the first end being pivotably mounted to and supported by the elongated bar;

(c) an upwardly extending support member rotatably mounted on the second end of the carriage member;

(d) mounting means attached to the support member, the mounting means being adapted to pivotably support the elongated boom;

(e) rotation means carried by the carriage member and being adapted to rotate the support member;

(f) elevation means carried by the support member, the elevation means being adapted to pivot the outer end of the boom upwardly and downwardly with respect to the support member.

In another embodiment the apparatus may be mounted or carried on a wheeled frame and towed behind the tractor, if desired. In this embodiment the apparatus includes the upwardly extending support member, the mounting means, the rotation means, and the elevation means as described above.

Other advantages of the apparatus of the invention will become apparent from the following description.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
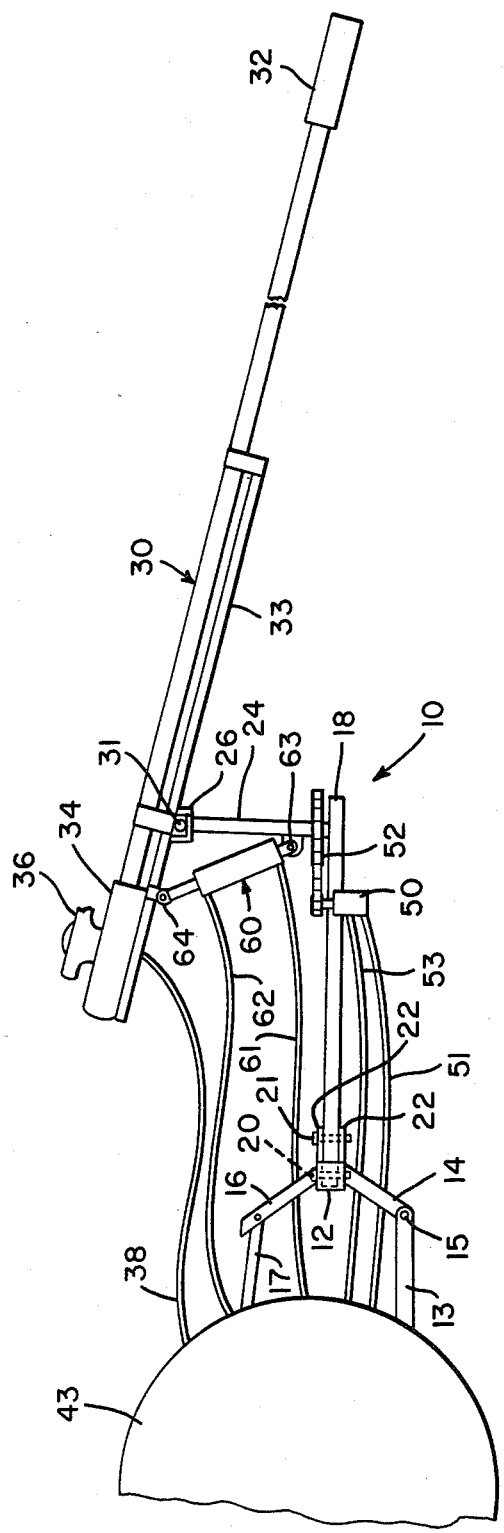
FIG. 1 is a side view of one embodiment of positionable weed burning apparatus of the invention.

In FIG. 1 there is shown a side view of one embodiment of positionable weed burning apparatus 10 which is detachably connected to the conventional three-point hitch of a farm tractor.

The apparatus of the invention comprises a horizontally disposed, elongated bar 12 (one end of which is visible in FIG. 1). Downwardly depending arms 14 (one of which is shown in FIG. 1) are secured to the underside of bar 12 and are adapted to be detachably connected to arms 13 of the three-point hitch by means of pins 15. Upwardly extending arm 16 is secured to the top of bar 12 and is adapted to be detachably connected to arm 17 of the tractor's three-point hitch. Arms 13 and 17 are attached to and carried by the tractor in the normal manner and are partially obscured by wheel 43.

Extending rearwardly from bar 12 is elongated carriage member 18 which is pivotably connected at one end to bar 12 by means of pin 20. Plate members 22 secured to bar 12 contain apertures in which a pin 21 may be inserted to lock carriage member 18 in a desired position.

Mounted at the outer end of carriage member 18 is upwardly extending support member 24. Member 24 is rotatably mounted with respect to carriage member 18. At the upper end of support member 24 there is mounting mean 26 which is adapted to pivotably support the weed burner boom 30. In a preferred embodiment the mounting means comprises a yoke or fork in which a horizontal mounting shaft 31 of the boom may rest. This is illustrated in more detail in FIG. 3. Preferably the upper ends of the yoke 26 extend beyond shaft 31 so that a bolt or pin 27 may be inserted through the fork above the shaft. This prevents the boom from becoming dislodged from the yoke during use.

The elongated burning boom 30 may be 20 feet long (or even longer) and is commercially available. The outer end 32 of the boom is a nozzle. The inward end of the boom includes a fan 34 which is powered by a motor 36. The fan mixes the fuel with air and forces it through the hollow boom to the nozzle 32 where it is ignited.

Figure 7:
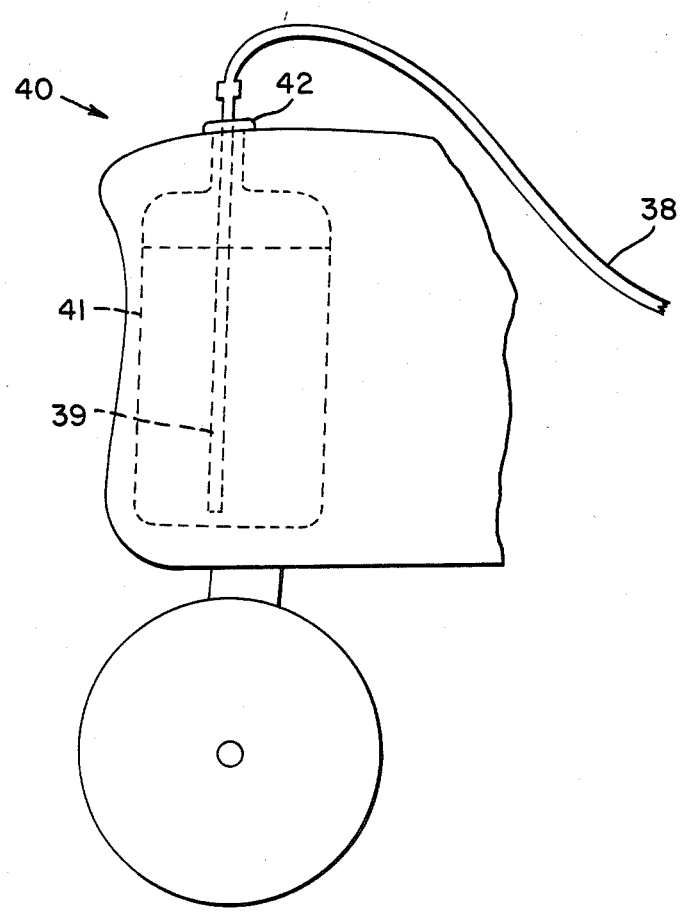
FIG. 7 illustrates one manner in which fuel may be supplied for the weed burning apparatus of the invention.
Figure 8:
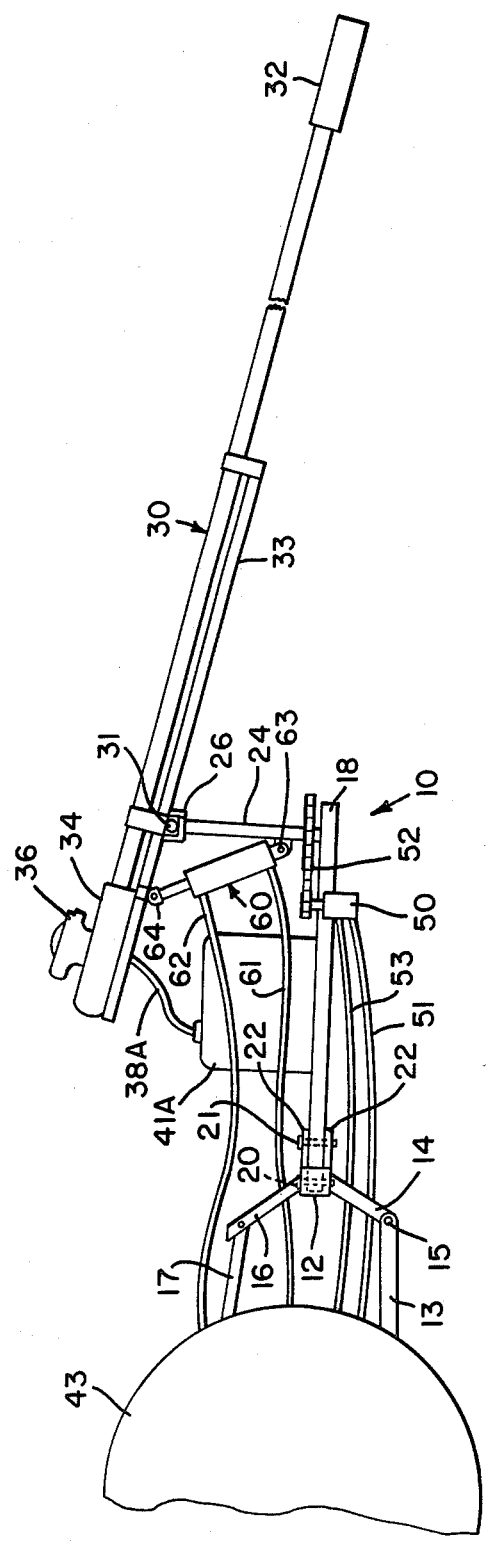
FIG. 8 illustrates an embodiment wherein the fuel tank is mounted on a carriage.
Figure 9:
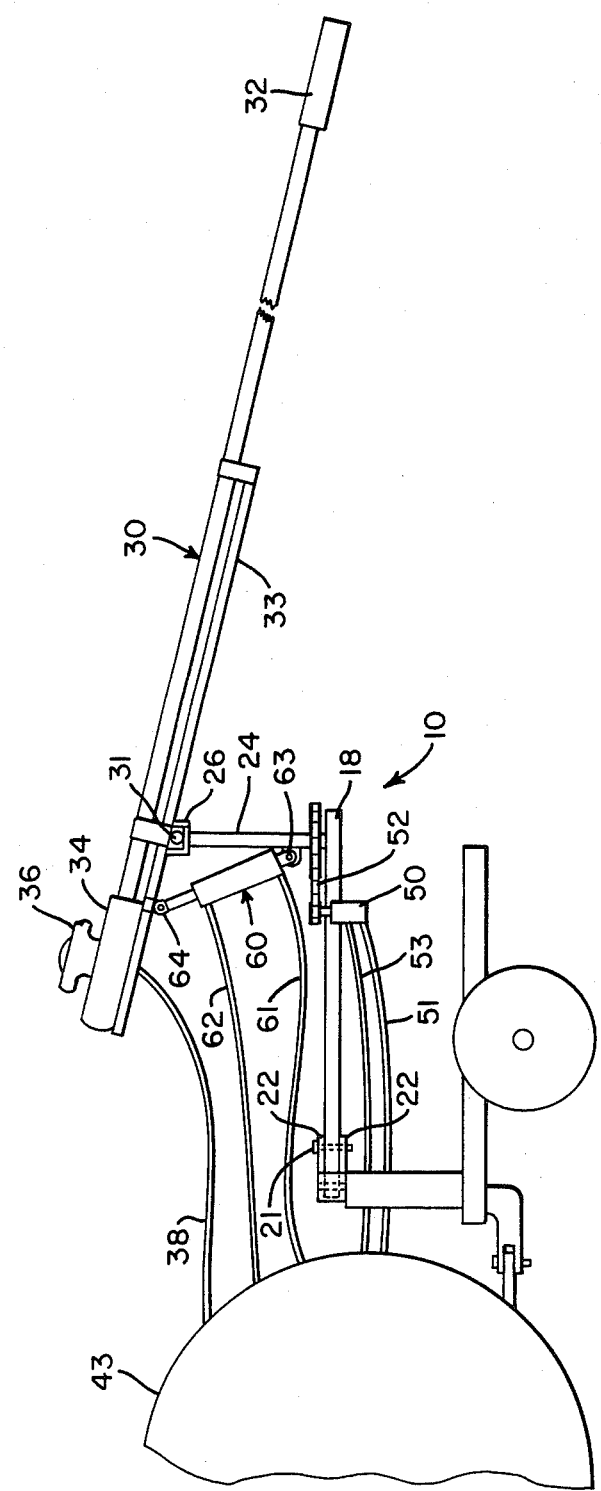
FIG. 9 illustrates an embodiment wherein the weed burning apparatus is mounted on a wheeled frame.

The fuel line 38 extends from a fuel to the fan, as shown. The fuel source may be a separate tank 41A (FIG. 8) (containing diesel fuel, for example) or it may be the fuel tank for the tractor itself. This is illustrated in FIG. 7. Fuel tank 41 of tractor 40 contains diesel fuel. Fuel line 38, or 38A extends through an opening in fuel cap 42 and extends into tank 41, or 41A as illustrated. Preferably the portion 39 of the line extending into tank 41 is made of steel (e.g., ⅜ inch line). The portion of line 38 extending between the tank 41 and the weed burner is flexible hose. If desired, portion 39 of the line may include an opening or aperture a few inches from the bottom of the tank so that fuel cannot be siphoned form tank 41 after it drops to a predetermined level.

Figure 3:
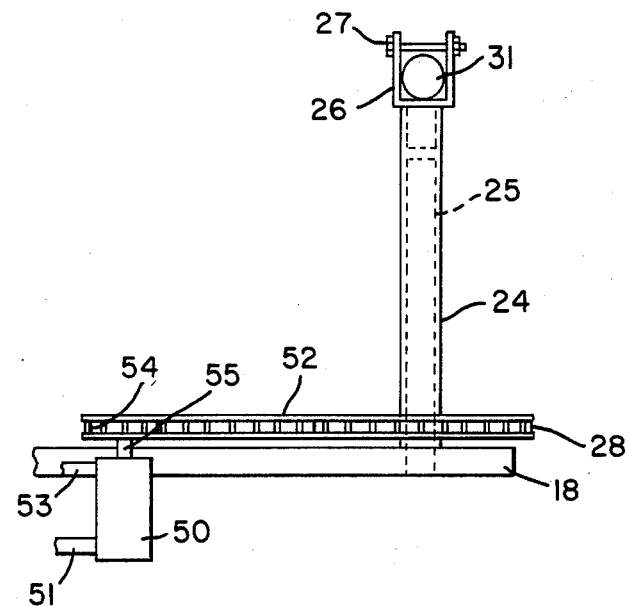
FIG. 3 is a side view illustrating the upwardly extending support member and the mounting means on the upper end of the support member.

The support member 24 is rotatably mounted on carriage member 18 so that it may be rotated in order to rotate boom 30 relative to the carriage member 18. A preferred manner of rotating support member is by means of a gear secured to support member 24 which is driven by hydraulic motor 50 and chain 52. Support member 24 is preferably hollow and fits over a stationary shaft or pipe 25 fastened to carriage member 18 as illustrated in FIG. 3). which are operably connected to the tractor. The hydraulic motor is connected by a shaft to a small gear which in turn drives chain 52 and then the gear secured to support member 24. In this manner the boom 30 may be moved to one side or another, as desired. The control for the hydraulic motor is located at the operator's position so that he may simply and quickly control the side-to-side position of the boom.

The boom 30 may also be adjusted vertically by the operator by means of elevation means 60, which preferably comprises a hydraulic cylinder controlled by hydraulic lines 61 and 62. One end 63 of the cylinder is attached to and supported by upright support member 24. The other end 64 of the cylinder is attached to a mounting on the boom support 33. Thus, when the cylinder 60 is lengthened or extended, the boom 30 pivots about shaft 31, causing the outer end thereof to be lowered. Conversely, when the cylinder 60 is retracted the outer end of the boom 30 is raised. The height of the boom may also be adjusted by raising or lowering the three-point hitch on the tractor, of course.

Figure 2:
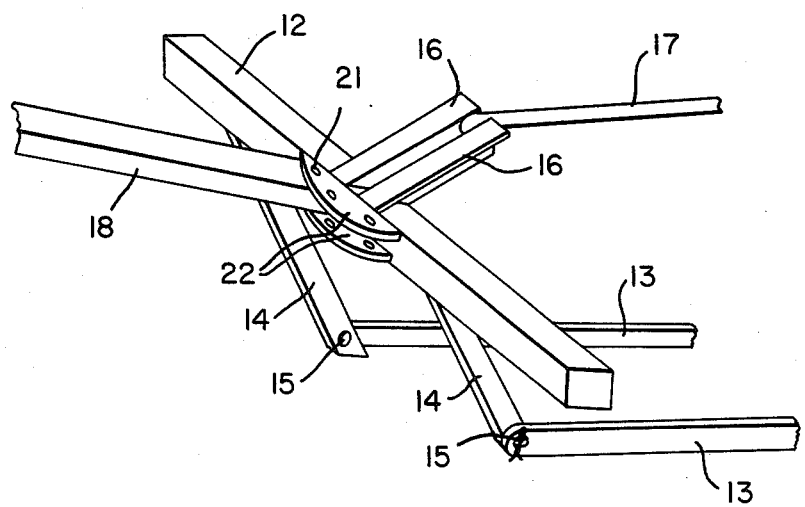
FIG. 2 is a perspective view illustrating the manner in which the apparatus is attached to a three-point hitch of a tractor.

In FIG. 2 there is a perspective view illustrating the manner in which the apparatus is attached to a conventional three-point hitch of a tractor. The three-point hitch includes lower arms 13 and upper arm 17. Downwardly depending arms 14 secured to the underside of beam or bar 12 are adapted to be detachably connected to arms 13. Upper attachment means 16 are secured to the top side of bar 12 and are adapted to be detachably mounted or connected to upper arm 17 of the three-point hitch.

Figure 6:
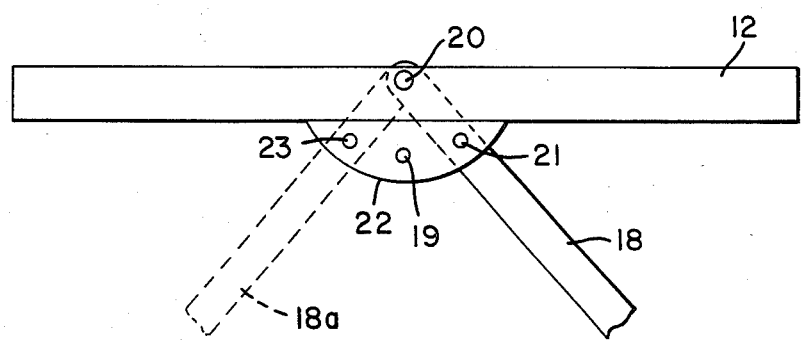
FIG. 6 is a top view illustrating the manner in which the elongated carriage member may pivot with respect to the mounting bar.

FIGS. 2 and 6 illustrate the manner in which elongated carriage member 18 is pivotably attached at one end to bar 12 by means of pin 20. Carriage member 18 extends rearwardly between plate members 22 which include a plurality of apertures therethrough (two of which are numbered 19 and 23). A pin 21 may be inserted through any desired aperture (and through a corresponding aperture in carriage member 18) in order to secure carriage member 18 in any desired position. The dotted lines 18a illustrate a position of carriage member 18 in an extreme left position. The center position may be used either when the burner is not being used or when the tractor is straddling the ditch being burned.

Figure 5:
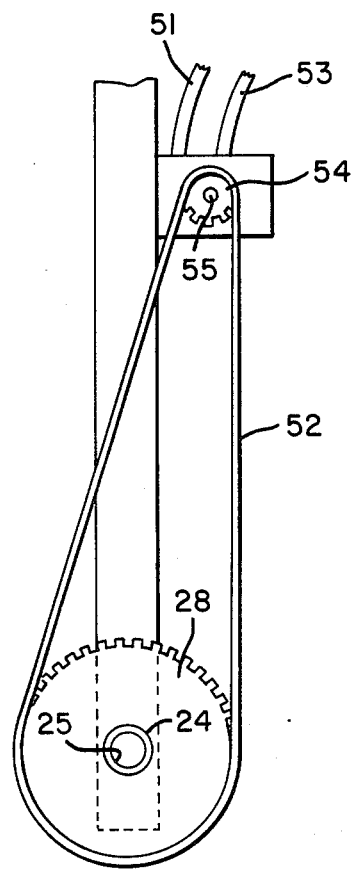
FIG. 5 is a top view illustrating the manner in which the rotation means is adapted to rotate the support member.

In FIG. 5 there is shown a top view illustrating the manner in which the hydraulic motor causes the support member 24 to rotate. The hydraulic motor causes shaft 55 and gear 54 to rotate. Entrained around gear 54 and gear 28 is chain 52. Gear 28 is secured to support member 24 so that when chain 52 is turned, gear 28 rotates and thereby causes support member 24 to rotate also. This causes the boom 20 to be moved to one side or the other, depending upon the direction of rotation of gear 28.

Other means for causing rotation of support member may instead be used, if desired. For example, an electric motor may be used instead of a hydraulic motor.

Figure 4:
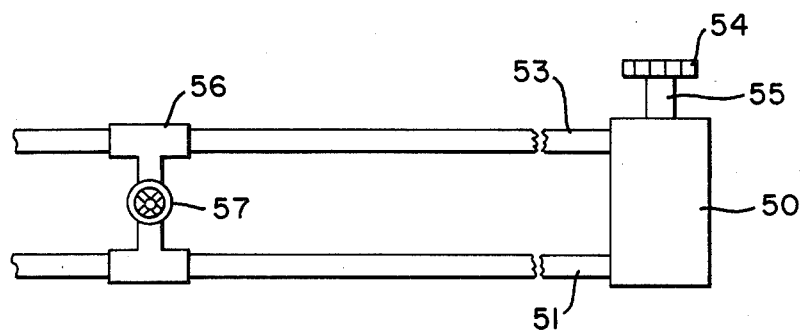
FIG. 4 illustrates one manner for driving the rotation means.

In FIG. 4 there is illustrated one manner in which the hydraulic motor 50 may be operably connected via hoses 51 and 53 to the tractor. A coupling 56 is preferably used to connect the two hoses 51 and 53, as illustrated. A valve 57 in the coupling controls flow between the two hoses and acts as a by-pass so that the speed of the hydraulic motor may be controlled.

A by-pass valve system of the type shown in FIG. 4 may also be included between hydraulic hoses 61 and 62 so that the speed of the hydraulic cylinder 60 may be controlled.

Other variants are possible without departing from the scope of the present invention. For example, the fuel source for the weed burner may be a tank which is carried on the carriage member, if desired. Also, the length of the boom may vary, as desired. Any type of weed burning boom may be accommodated in this invention.

It is also possible to have the support apparatus carried on a wheeled frame which may be towed behind a tractor and still be controlled from the tractor operator's position. For example, the wheeled frame may have one, two, three or four wheels. An upwardly extending support member is rotatably mounted or carried by the frame. Mounting means is attached to the support member, and the mounting means is adapted to pivotably support the elongated burner boom in the manner described above in connection with FIGS. 1 and 3. Rotation means is carried by the frame and is adapted to rotate the support member. Elevation means is carried by the support member and is adapted to pivot the outer end of the boom upwardly and downwardly with respect to the support member. The rotation means and elevation means are controlled by the operator of the tractor towing the apparatus in the same manner as described above in connection with the embodiment of FIG. 1.

What is claimed is:

1. Positionable weed burning apparatus which is adapted to support an elongated burner boom of the type having a fuel inlet at its inner end and a nozzle at the outer end thereof, wherein said apparatus is further adapted to be connected to a three-point hitch on a tractor having a fuel tank and a hydraulic system, said apparatus comprising:
   (a) a horizontally disposed elongated bar having attachment means adapted to detachably connect said bar to said three-point hitch on said tractor;
   (b) an elongated carriage member having first and second ends; said first end being pivotably mounted to and supported by said elongated bar; wherein said first end of said carriage member is mounted to said elongated bar by means of a pin extending through said first end of said carraige member and through said bar;
   (c) an upwardly extending support member rotatably mounted on said second end of said carriage member;
   (d) mounting means attached to said support member, said mounting means being adapted to pivotably support said elongated boom;
   (e) rotation means carried by said carriage member and being adapted to rotate said support member;
   (f) elevation means carried by said support member, said elevation means being adapted to pivot said outer end of said boom upwardly and downwardly with respect to said support member.

2. Apparatus in accordance with claim 1, wherein said carraige member is adapted to be pivoted toward either side of said tractor; and wherein said carriage member is further adapted to be secured in a desired position relative to said elongated bar by means of a securement pin extending through registering apertures in said carriage member and said elongated bar.

3. Apparatus in accordance with claim 1, wherein said upwardly extending support member comprises a hollow tubular member which is fitted over a stationary shaft carried by said carriage member.

4. Apparatus in accordance with claim 3, wherein said rotation means comprises:
   (a) a hydraulic motor operably connected to said hydraulic system of said tractor by means of hydraulic lines, said hydraulic motor being adapted to be powered by said hydraulic system of said tractor,
   (b) a drive chain operably connected to said hydraulic motor;
   (c) a gear secured to said support member; wherein said drive chain is operably connected to said gear in a manner such that said hydraulic motor is adapted to power said drive chain and rotate said gear, thereby causing rotation of said support member.

5. Apparatus in accordance with claim 3, wherein said rotation means comprises:
   (a) an electric motor adapted to be powered by the electrical system of said tractor;
   (b) a drive chain operably connected to said electric motor;
   (c) a gear secured to said support member; wherein said drive chain is operably connected to said gear in a manner such that said electric motor is adapted to power said drive chain and rotate said gear, thereby causing rotation of said support member.

6. Apparatus in accordance with claim 1, wherein said elevation means comprises a hydraulic cylinder which is mounted at one end to said support member and which is mounted at its other end to said boom, wherein said hydraulic cylinder is adapted to raise said oute end of said boom when said cylinder is retracted and is adapted to lower said outer end of said boom when said cylinder is extended.

7. Apparatus in accordance with claim 1, wherein a fuel line is operably connected between said burner boom and said fuel tank of said tractor.

8. Apparatus in accordance with claim 1, further comprising a fuel supply carried by said carriage member and a fuel line operably connected between said burner boom and said fuel supply.

9. Apparatus in accordance with claim 4, further comprising a by-pass valve opreratively associated with said hydraulic motor in said hydraulic lines.

10. Positionable weed burning apparatus which is adapted to support an elongated burner boom of the type having a fuel inlet at its inner end and a nozzle at the outer end thereof, wherein said apparatus is further adapted to be connected to a three-point hitch on a tractor having a fuel tank and a hydraulic system, said apparatus comprising:
   (a) a horizontally disposed elongated bar having attachment means adapted to detachably connect said bar to said three-point hitch on said tractor;
   (b) an elongated carriage member having first and second ends; said first end being pivotably mounted to and supported by said elongated bar; wherein said first end of said carriage member is mounted to said elongated bar by means of a pin extending through said first end of said carriage member and through said bar;
   (c) an upwardly extending support member rotatably mounted on said second end of said carriage member;
   (d) moutning means attached to said supported member, said mounting means being adapted to pivotably support said elongated boom;

(e) rotation means carried by said carriage member and being adapted to rotate said support member;
(f) elevation means carried by said support member, said elevation means being adapted to pivot said outer end of said boom upwardly and downwardly with respect to said support member;

wherein said carriage member is adapted to be pivoted toward either side of said tractor; wherein said carriage member is further adapted to be secured in a desired position relative to said elongated bar by means of a securement pin extending through registering apertures in said carriage member and said elongated bar; wherein said upwardly extending support member comprises a hollow tubular member which is fitted over a stationary shaft carried by said carriage member.

11. Apparatus in accordance with claim 10, wherein said rotation means comprises:
(a) a hydraulic motor operably connected to said hdyraulic system of said tractor by means of hydraulic lines, said hydraulic motor being adapted to be powered by said hydraulic system of said tractor;
(b) a dirve chain operably connected to said hydraulic motor;
(c) a gear secured to said support member;

wherein said drive chain is operably connected to said gear in a manner such that said hydraulic motor is adapted to power said drive chain and rotate said gear, thereby causing rotation of said support member.

12. Apparatus in accordance with claim 10, wherein said elevation means comprises a hydraulic cylinder which is mounted at one end to said support member and which is mounted at its other end to said boom, wherein said hydraulic cylinder is adapted to raise said outer end of said boom when said cylinder is retracted and is adapted to lower said outer end of said boom when said cylinder is extended.

13. Positionable weed burning apparatus which is adapted to support an elongated burner boom of the type having a fuel inlet at its inner end and a nozzle at the outer end thereof, wherein said apparatus is further adapted to be towed behind a tractor having a fuel tank and a hydraulic system, said apparatus comprising:

(a) a wheeled frame which is adapted to be detachably connected to said tractor;
(b) an upwardly extending support member carried by said frame, said support member being adapted to rotate relative to said frame;
(c) mounting means attached to said support member, said mounting means being adapted to pivotably support said elogated boom;
(d) rotation means carried by said frame and being adapted to rotate said support member;
(e) elevation means carried by said support member, said elevation means being adapted to pivot said outer end of said boom upwardly and downwardly with rspect to said support member.

14. Apparatus in accordance with claim 13, wherein said rotation means comprises:
(a) a hydraulic motor operably connected to said hydraulic system of said tractor by means of hydraulic lines, said hydraulic motor being adapted to be powered by said hydraulic system of said tractor;
(b) a drive chain operably connected to said hydraulic motor;
(c) a gear secured to said support member;

wherein said drive chain is operably connected to said gear in a manner such that said hydraulic motor is adapted to power said drive chain and rotate said gear, thereby causing rotation of said support member.

15. Apparatus in accordance with claim 13, wherein said elevation means comprises a hydraulic cylinder which is mounted at one end to said support member and which is mounted at its other end to said boom, wherein said hdyraulic cylinder is adapted to raise said outer end of said boom when said cylinder is retracted and is adapted to lower said outer end of said boom when said cylinder is extended.

16. Apparatus in accordance with claim 13, wherien a fuel line is operably connected between said burner boom and said fuel tank of said tractor.

17. Apparatus is accordance with claim 14, further comprising a by-pass valve operatively associated with said hydraulic motor in said hydraulic lines.

* * * * *